United States Patent [19]

Eckel

[11] Patent Number: 4,469,965
[45] Date of Patent: Sep. 4, 1984

[54] ELECTRIC MOTOR STATOR ASSEMBLY

[75] Inventor: Merowech Eckel, Klagenfurt, Austria

[73] Assignee: U.S. Philips Corporation, New York, N.Y.

[21] Appl. No.: 539,882

[22] Filed: Oct. 7, 1983

[30] Foreign Application Priority Data

Oct. 7, 1982 [AT] Austria .................................. 3708/82

[51] Int. Cl.³ .............................................. H02K 1/12
[52] U.S. Cl. ..................................... 310/254; 310/217
[58] Field of Search ............................... 310/216–218, 310/254, 258, 259, 89, 91

[56] References Cited

U.S. PATENT DOCUMENTS

| 2,629,061 | 2/1953 | Swarthout | 310/217 UX |
| 2,792,512 | 5/1957 | Koch | 310/217 X |
| 2,921,208 | 1/1960 | Morrill | 310/217 X |
| 3,390,289 | 6/1968 | Dijken et al. | 310/254 X |
| 3,814,963 | 6/1974 | Laing | 310/217 |
| 3,826,941 | 7/1974 | Folmar | 310/217 |
| 4,217,690 | 8/1980 | Morreale | 310/217 X |

Primary Examiner—Mark O. Budd
Attorney, Agent, or Firm—Robert S. Smith

[57] ABSTRACT

In an electric motor comprising a U-shaped laminated stator core, whose two limbs each carry an exciter winding, a rotor mounted on a motor shaft, and two bearing shields, one bearing shield is provided with at least three sword-shaped projections, of which at least two projections enclose the outer sides of the two limbs of the laminated stator core and of which a third projection is arranged between the two limbs of the laminated stator core, the last-mentioned projection being provided with a T-shaped member, whose transverse limb is positioned against the yoke of the laminated stator core from the inner side. The other bearing shield is formed with openings through which the free ends of the projections extend and can be secured from the outer side of this bearing shield.

7 Claims, 4 Drawing Figures

ELECTRIC MOTOR STATOR ASSEMBLY

The invention relates to an electric motor comprising an U-shaped laminated stator-core, whose two limbs each carry an exciter winding, a rotor mounted on a motor shaft, and two bearing shields, by means of which the motor shaft is journalled and which serve as mounting devices for the motor. Such a motor, which is frequently employed for driving small domestic appliances, such as citrus presses, is disclosed in for example AT-PS No. 355,753. In this known motor, in which one bearing shield also serves as a mounting device for other parts of the appliance, both bearing shields are connected to the laminated stator-core by means of screws, which extend through corresponding holes in the laminated core. However, several alternative methods have been proposed for assembling such motors. For example, in accordance with DE-PS No. 12 86 194 the bearing shields are pressed into clamping sleeves, pins arranged on one bearing shield extending through the sleeves and the holes in the second bearing shield, so that the free ends of the fixing pins can be secured to the second bearing shield from the other side by riveting or welding to form a constructional unit. However, all in all the afore-mentioned assembly methods are comparatively expensive and intricate.

The invention aims at providing an electrical motor of the type mentioned in the opening sentence, which can be assembled in a particularly simple manner using a minimal number of parts, so that it is very suitable for the series manufacture of large quantities, in particular for fully automated assembly. According to the invention one bearing shield is provided with at least three sword-shaped projections which extend perpendicularly to the bearing shield, at least two projections, which relative to the motor shaft are arranged substantially opposite each other, enclose the outer sides of the two limbs of the laminated stator core, a third projection is arranged between the two limbs of the laminated stator core at a location adjacent the rotor, the second bearing shield is formed with openings of a shape corresponding to the shape of the projections, through which openings the free ends of said projections extend and are secured from the outer side of said bearing shield, and the third projection is provided with a T-shaped member whose longitudinal limb extends from the third projection between the exciter windings and whose transverse limb is positioned from the inner side against the yoke which interconnects the two limbs of the laminated stator core. In this way the two projections which enclose the outer sides of the two limbs of the laminated stator core and the transverse limb of the T-shaped member connected to the third projection, against which limb the yoke of the laminated stator core is positioned from the inner side, provide a suitable positioning of the laminated stator core, so that after the laminated stator core and the rotor have been fitted in the bearing shield provided with the projections, only the second bearing shield has to be placed on the free ends of the projections, after which the free ends of these projections can be secured from the outer side of this second bearing shield, for example, by welding, riveting, bending or the like. As can be seen, such an assembly process is very simple, no additional parts being required. Since one bearing shield is provided with at least three projections arranged in the manner described, a satisfactory stability of the entire unit is achieved. A further advantage is that such a motor can be designed simply for different power ratings, because the same bearing shields may also be used for the assembly of laminated stator cores and rotors of different axial height.

There are various possibilities of positioning the laminated stator core by means of the sword-shaped projections, which projections in principle comprise two broad sides and two narrow sides. For example, the narrow sides of the projections which enclose the outer sides of the limbs of the laminated stator core may cooperate with said limbs. However, it is found to be advantageous if broad sides of the projections which enclose the outer sides of the limbs of the laminated stator core engage with said limbs. In this way these projections ensure a correct positioning even if there are provided only two such projections, because they co-operate with the laminated stator core with their broad sides.

In this respect it is also found to be advantageous if at least one projection comprises at least one reinforcement rib which extends in the longitudinal direction of said projection. This results in a very high stability of the projection or projections and consequently of the entire unit.

Moreover, it is found to be advantageous if the broad sides of the third projection extend transversely of the longitudinal axis of the two limbs of the laminated stator core, the longitudinal limb of the T-shaped member projecting from the broad side which is remote from the rotor. Such an arrangement of the third projection also leads to an increased stability of the unit.

It is also found to be very advantageous if the two narrow sides of the third projection are each positioned against the adjacent limb of the laminated stator core from the inner side. In this way the third projection, in conjunction with the projections which enclose the two limbs of the laminated stator core, assists in positioning the laminated stator core.

It is found to be particularly advantageous if at least one of the two narrow sides of the third projection engages a groove formed in the adjacent limb of the laminated stator core, its broad side which faces the rotor being positioned against the adjacent side wall of the groove. This results in a particularly accurate and reliable position of the laminated stator core, because the third projection also assists in this positioning in conjunction with the transverse limb of the T-shaped member connected to the third projection.

It is also found to be advantageous if the two exciter windings fit precisely between the third projection and the transverse limb of the T-shaped member connected to the third projection. This ensures that the exciter windings are also positioned correctly.

An embodiment of the invention will now be described in more detail, by way of example, with reference to the drawings.

Figure 1:
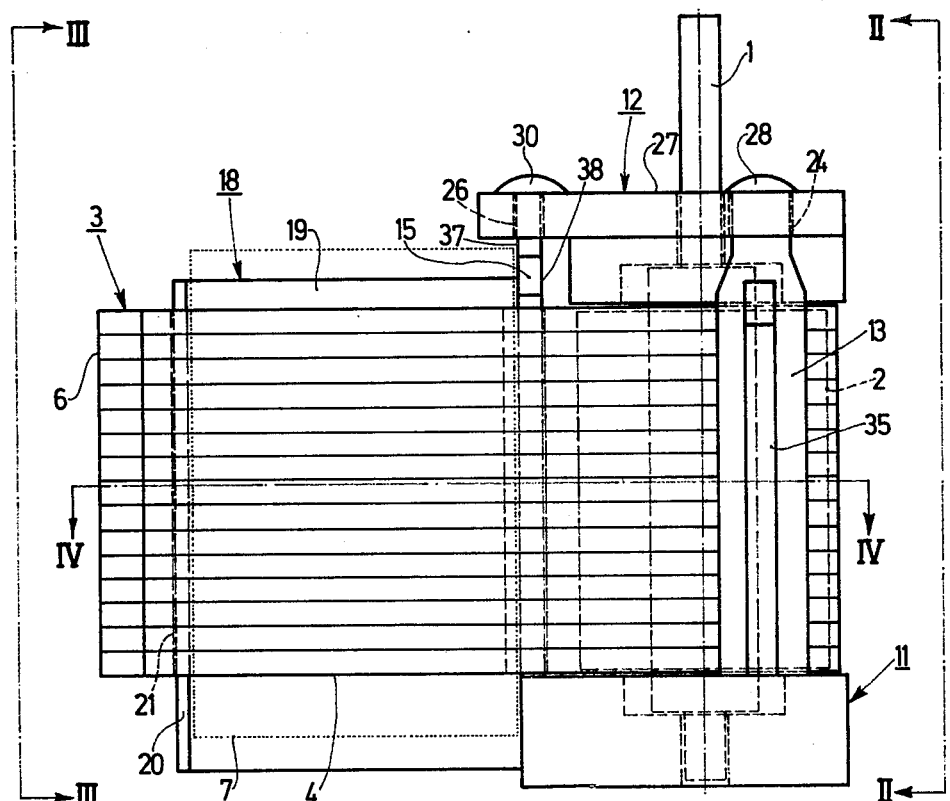
FIG. 1 is a side view of an electric motor having one bearing shield provided with three projections.

The electric motor shown in the Figures comprises a motor shaft 1 on which a rotor 2 is mounted which cooperates with a laminated stator core 3, which is U-shaped and which comprises two limbs 4 and 5 and a yoke 6 inter-connecting these two limbs. Each of the limbs 4 and 5 carries an exciter winding 7 and 8, respectively, which for simplicity are represented as simple rectangles. The inner sides 9 and 10 of the two limbs 4 and 5 are formed as pole pieces near their free ends, air gaps being formed between these pole pieces and the rotor 2. For mounting the motor there are provided two bearing shields 11 and 12, in which the motor shaft 1 is journalled and which define the position of the rotor 2 relative to the laminated stator core 3, so that a unit is formed, as will be described hereinafter. Such a motor may be for example a two-pole single-phase synchronous motor with diametrically magnetized permanent-magnet rotor, as is frequently used in large quantities for driving small domestic appliances such as citrus presses, can openers and the like. However, such a motor may also operate in accordance with a different principle, for example as a hysteresis motor, as is generally known.

In order to simplify the assembly of such a motor one bearing shield, in the present case a bearing shield 11, is provided with three sword-shaped projections 13, 14 and 15 which extend perpendicularly to the bearing shield, two of these projections 13 and 14 being arranged substantially opposite each other relative to the motor shaft 1 and enclosing the outer sides 16 and 17 respectively of the two limbs 4 and 5 of the laminated stator core 3, and the third projection 15 being arranged between the two limbs 4 and 5 of the said core 3 at a location adjacent the rotor 2. Furthermore, a T-shaped member 18 is connected to the third projection 15, the longitudinal limb 19 of this member extending from this third projection 15 between the exciter windings 7 and 8 and its transverse limb 20 being positioned against the yoke 6 which interconnects the two limbs 4 and 5 of the laminated stator core 3 from the inner side 21. In this way the projections 13 and 14 and the transverse limb 20 on the bearing shield 11 define a space in which the laminated stator core 3 with the exciter windings 7 and 8 can be fitted so that the yoke 6 abuts with the transverse limb 20. Thus, the laminated stator core 3 is positioned so that its position relative to the rotor 2 is defined when the rotor shaft 1 is inserted into the bearing shield 11. As can be seen, the projections 13 and 14 provide a positioning in a direction transverse to the longitudinal direction of the limbs 4 and 5, as is indicated by the double arrow 22 in FIG. 4, and the transverse limb 20 provides a positioning in the longitudinal direction of the limbs 4 and 5, as is indicated by the arrow 23 in FIG. 4.

The second bearing shield 12 is provided with openings 24, 25 and 26 whose shape corresponds to the shape of the sword-shaped projections 13, 14 and 15, so that this shield can be placed onto the free ends of these projections, which free ends then extend through the openings 24, 25 and 26 and thus project from the outer side 27 of this bearing shield 12. It is obvious that when the bearing shield 12 is thus placed onto the projections 13, 14 and 15 of the bearing shield 11 the motor shaft 1 is inserted into the bearing of this bearing shield 12. Assembly of the motor is then completed by scanning the free ends of the projections 13, 14 and 15 which protrude from the bearing shield 12 from the outside 27 of this shield, which may be effected simply by suitably deforming these free ends. As such bearing shields may be manufactured simply and effectively as plastics parts, said deformation may be effected simply by means of ultrasonic welding, so that heads 28, 29 and 30 are formed on the free ends of the projections 13, 14 and 15 which protrude from the openings 24, 25 and 26, which heads bear against the outer surface 27 of the bearing shield 12 and thereby retain the entire assembly. However, if the projections are metal parts, the deformation may be effected by riveting or bending. Obviously, the free ends of said projections 13, 14 and 15 may be secured in a different manner, for example by fitting clamping elements on the free ends of said projections or by the use of other known fixing means or fixing methods.

It will be appreciated that such an assembly of the motor is particularly simple and may be fully automated, so that a motor of this construction is particularly suitable for series manufacture in large quantities.

In the present example further steps have been taken to ensure an accurate and reliable positioning of the laminated stator core and a high stability of the entire unit.

Figure 4:
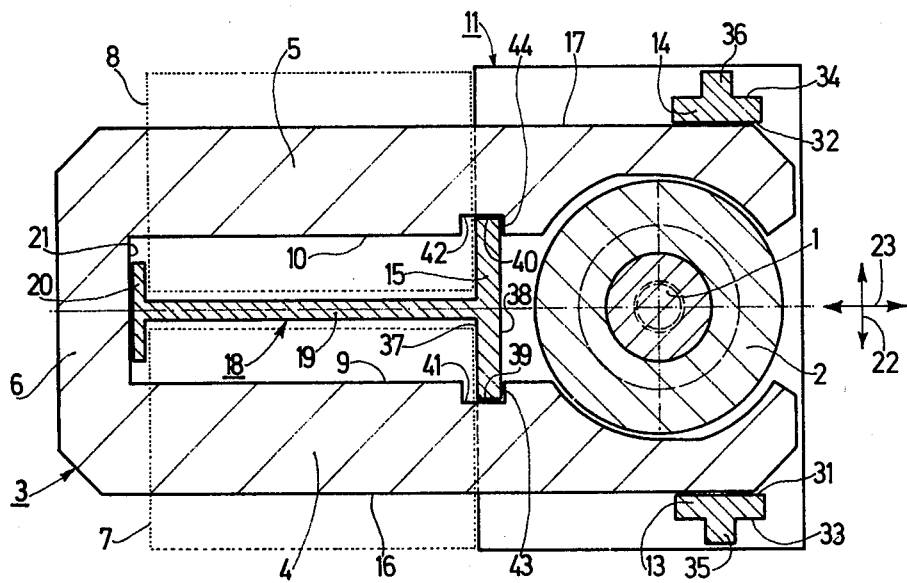
FIG. 4 is a sectional view of the motor taken on the line IV—IV in FIG. 1.
Figure 2:
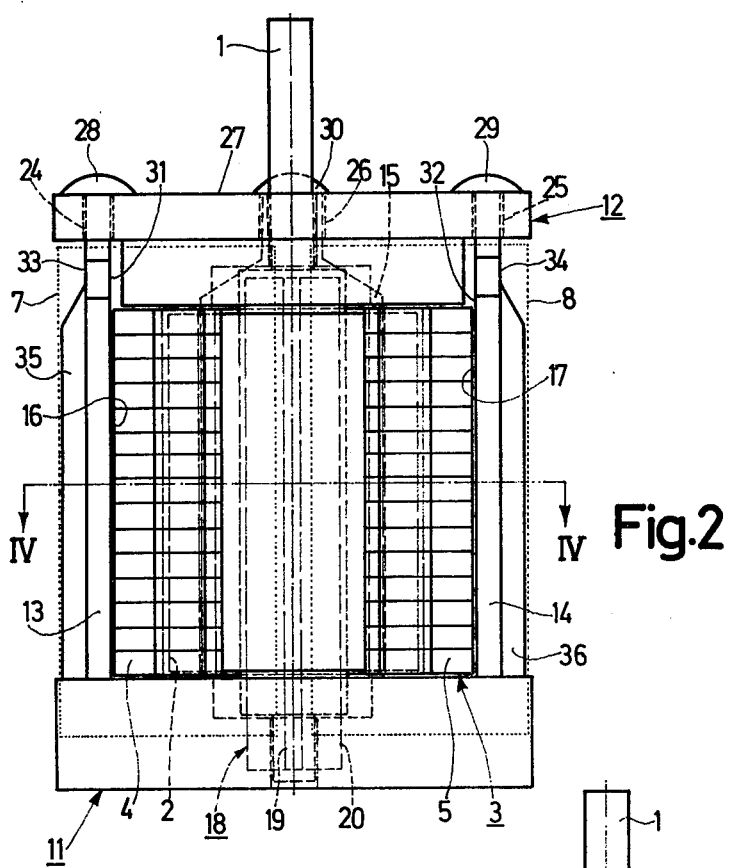
FIG. 2 is a sectional view of the motor taken on the line II—II in FIG. 1.
Figure 3:
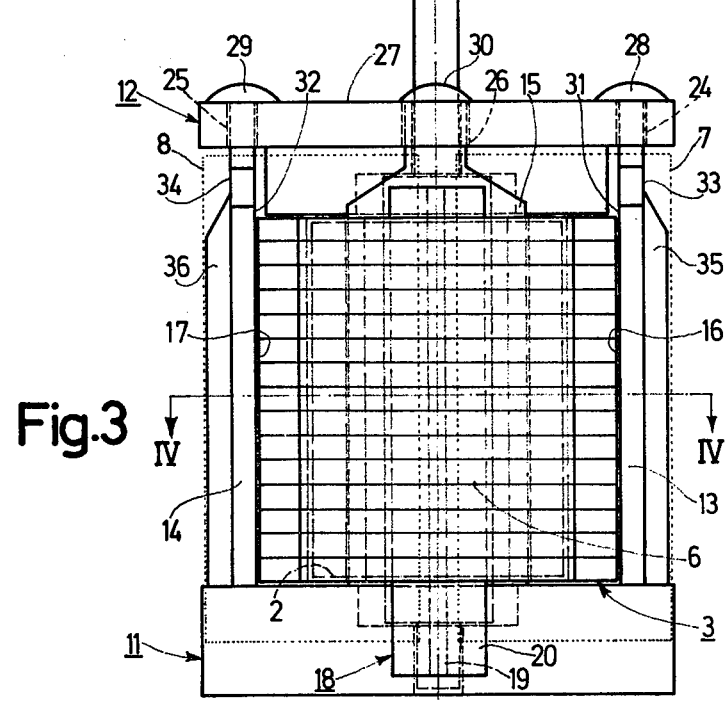
FIG. 3 is a sectional view of the motor taken on the line III—III in FIG. 1.

For this purpose broad sides 31 and 32 respectively of the projections 13 and 14, are positioned against the outer sides 16 and 17 of the limbs 4 and 5 respectively of the laminated stator core 3, as can be seen in FIG. 4. Moreover, on the broad sides 33 and 34 which are remote from the stator-core limbs the projections 13 and 14, which enclose the outer sides 16 and 17 of the limbs 4 and 5 of the laminated stator core, are provided with reinforcement ribs 35 and 36 respectively which extend in the longitudinal direction of the projections. In the present example these reinforcement ribs 35 and 36 extend only over a specific portion of the longitudinal dimension of said projections 13 and 14, as can be seen in the Figures. Of course, the ribs may extend up to the free ends of the projections, in which case the openings 24 and 25 in the bearing shield 12 should be given a shape corresponding to the cross-section of these projections, so as to allow the passage of the free ends of the projections through these openings. In this way it is achieved that the projections 13 and 14 enclose the limbs 4 and 5 of the laminated stator core 3 with a large surface area, thereby ensuring a correct engagement and a higher stability. If desired, the projection 15 may be provided with an additional reinforcement rib for an even higher stability.

Moreover, the broad sides 13 and 14 of the projection 15 extend transversely of the longitudinal direction of the two limbs 4 and 5 of the stator core 3, the longitudinal limb 19 of the T-shaped member 18 projecting from the broad side 37 which is remote from the rotor 2. As a result of this, the projection 15 is disposed at right angles to the two other projections 13 and 14, which also leads to an improved stability of the entire unit. However, in principle the member 15 may be oriented in the same way as the projections 13 and 14, the longitudinal limb 19 of the T-shaped member then projecting from the narrow side of the projection 15 which is remote from the rotor. As can be seen in particular in FIG. 4, the two narrow sides 39 and 40 of the projection 15 engage corresponding grooves 41 and 42 formed in adjacent limbs 4 and 5 respectively of the stator core 3, the broad side 48 which faces the rotor 2 engaging with the adjacent side walls 43 and 44 of the grooves 41 and 42 respectively. Moreover, the narrow sides 39 and 40 of the projection 15 are positioned against the adjacent limbs 4 and 5 of the stator core from the inner sides 9 and 10 respectively, the narrow sides 39 and 40 of the projection 15 then engaging with the bottoms of the respective grooves 41 and 42.

Thus, it is achieved that the projection 15 assists in positioning the laminated stator core 3 in two ways. By the cooperation of the projection 15 with the transverse limb 20 of the T-shaped member 18 the laminated stator core 3 is positioned in the direction indicated by the double arrow 23, because the broad side 38 of the projection 15 is positioned against the side walls 43 and 44 of the grooves 41 and 42 and the transverse limb 20 abuts with the inner side 21 of the yoke 6. Moreover, owing to the cooperation of the projection 15 with the projections 13 and 14, which each enclose the outer sides 16 and 17 of the two limbs 4 and 5 of the laminated stator core 3, the stator core 3 is also positioned in a direction indicated by the double arrow 22, because the projections 13 and 14 engage with the outer sides 16 and 17 respectively of the two limbs 4 and 5 respectively and the narrow sides 39 and 40 of the projection 15 each engage with the bottom of the grooves 41 and 42 in the limbs 4 and 5 from the inner sides 9 and 10 respectively. This results in a very accurate and reliable position of the laminated stator core 3. It is obvious that all the parts involved in the positioning must be so dimensioned with respect to each other that the position of the stator lamination assembly is not overdefined and that the laminated stator core can be placed on the bearing shield 11 smoothly and without jamming. Of course, it is not essential that the positioning steps described in the foregoing for the projection 15 are used in combination, but this is also possible to use only one step for positioning in one direction or in the other direction, depending on the obtaining specifications.

Finally, in the present embodiment the two exciter windings 7 and 8 fit precisely between the projection 15 and the transverse limb 20 of the T-shaped member 18 which is connected to the projection 15, as can be seen in particular in FIG. 4. In this way the exciter windings 7 and 8 can be positioned and retained in this position in a simple manner without additional means. The exciter windings may be self-supporting coils or coils arranged on coil formers. For the connection of the exciter windings 7 and 8 to the power supply of the motor, one of the bearing shields 11 or 12 may be provided with connection terminals, which are not shown. For this purpose a suitable strip for mounting the connection terminals may be formed on the T-shaped member 18, for example on its transverse limb 20.

As will be apparent from the foregoing, several modifications to the embodiments described are possible without departing from the scope of the invention. This is in particular so for the construction and arrangement of the sword-shaped projections 13, 14 and 15 on the bearing shield 11. For example, there may be provided more than three such projections. There may be provided for example a further projection which relative to the motor shaft 1 is disposed opposite the projection 15. However, in addition to the projection 13 and 14 there may be provided two further projections which also enclose the outer sides of the two limbs of the laminated stator core. It is to be noted that the projections may have different cross-sectional shapes, which may also influence their stability. Their cross-sectional shape may be, for example, U-shaped or semi-circular.

What is claimed is:

1. An electric motor comprising an U-shaped laminated stator-core, whose two limbs each carry an exciter winding, a rotor mounted on a motor shaft, and two bearing shield by means of which the motor shaft is journalled and which serve as mounting devices for the motor, characterized in that one bearing shield is provided with at least three sword-shaped projections which extend perpendicularly to the bearing shield, at least two projections, which relative to the motor shaft are arranged substantially opposite each other, enclose the outer sides of the two limbs of the laminated stator core, a third projection is arranged between the two limbs of the laminated stator core at a location adjacent the rotor, the second bearing shield is formed with openings of a shape corresponding to the shape of the projections, through which openings the free ends of said projections extend and are secured from the outer side of said bearing shield, and the third projection is provided with a T-shaped member whose longitudinal limb extends from the third projection between the exciter windings and whose transverse limb is positioned from the inner side against the yoke which interconnects the two limbs of the laminated stator core.

2. An electric motor as claimed in claim 1, characterized in that broad sides of the projections which enclose the outer sides of the limbs of the laminated stator core engage with said limbs.

3. An electric motor as claimed in claim 1 or 2, characterized in that at least one projection comprises at least one reinforcement rib which extends in the longitudinal direction of said projection.

4. An electric motor as claimed in any one of the preceding claims, characterized in that the broad sides of the third projection extend transversely of the longitudinal axis of the two limbs of the laminated stator core, the longitudinal limb of the T-shaped member projecting from the broad side which is remote from the rotor.

5. An electric motor as claimed in claim 4, characterized in that the two narrow sides of the third projection are each positioned against the adjacent limb of the laminated stator core from the inner side.

6. An electric motor as claimed in claim 4 or 5, characterized in that at least one of the two narrow sides of the third projection engages a groove formed in the adjacent limb of the laminated stator core, its broad side which faces the rotor being positioned against the adjacent side wall of the groove.

7. An electric motor as claimed in any one of the claims 4 to 6, characterized in that the two exciter windings fit precisely between the third projection and the transverse limb of the T-shaped member connected to the third projection.

* * * * *